United States Patent [19]

Kanda

[11] Patent Number: 4,886,340
[45] Date of Patent: Dec. 12, 1989

[54] OPTICAL DEVICE FOR PRECISION WORK

[75] Inventor: Kouji Kanda, Osaka, Japan

[73] Assignee: Kanda Optical Co., Ltd., Japan

[21] Appl. No.: 217,558

[22] Filed: Jul. 11, 1988

[30] Foreign Application Priority Data

Jul. 20, 1987 [JP] Japan .................. 62-181721

[51] Int. Cl.⁴ .................. G02B 23/00; G02B 7/06
[52] U.S. Cl. ........................ 350/145; 350/146; 350/545; 350/550; 350/551; 350/552; 350/555; 350/556
[58] Field of Search ............. 350/145, 546, 545, 146, 350/551, 547, 548, 549, 550, 552, 554, 555, 556

[56] References Cited

U.S. PATENT DOCUMENTS 731,820 6/1903 Stevens ................. 350/546
2,280,354 4/1942 Rezos ................. 350/546 X

FOREIGN PATENT DOCUMENTS 98458 7/1898 Fed. Rep. of Germany ...... 350/546

Primary Examiner—Scott J. Sugarman
Attorney, Agent, or Firm—Pravel, Gambrell, Hewitt, Kimball & Krieger

[57] ABSTRACT

An optical device comprising a wearing member to be attached to the body of the user, a first lens holder provided on the wearing member and having attached thereto a pair of eyepiece concave lenses as spaced apart by an adjustable distance, and a second lens holder connected to the wearing member or to the first lens holder and having attached thereto a pair of objective convex lenses as spaced apart by an adjustable distance. Accordingly, the distance between the eyepiece concave lenses and the distance between the objective convex lenses are adjustable each independently of the other to position the optical center of each lens accurately on the visual axis of the corresponding eye of the user.

13 Claims, 3 Drawing Sheets

OPTICAL DEVICE FOR PRECISION WORK

FIELD OF THE INVENTION

The present invention relates to optical devices for precision work, and more particularly to optical devices which are convenient to wear in carrying out delicate work such as inspection of wiring of electronic devices and surgeries.

BACKGROUND OF THE INVENTION

Loupes or magnifying glasses such as those of the hand, stand or binocular type are widely used for conducting delicate work.

The hand magnifying glass is inconvenient in that work must be done with one hand with the magnifying glass held by the other hand.

Although the stand magnifying glass is convenient to use in viewing one point at the work site, the glass must be moved when to be used for a somewhat wider work area. Further in the case of the stand magnifying glass, both eyes will be directed toward the object, but it is viewed with one eye, i.e. by the dominant eye. More specifically, an image of the object as viewed by the eye other than the dominant eye is perceived as located at a position quite different from that of the image perceived by the dominant eye, and the two images are fused into an image in the brain for perception. Accordingly, the glass has the problem of causing fatigue to the user when used for a prolonged period of time.

The binocular magnifying glass can be removably attached to the head of the worker and is therefore convenient in that the work can be conducted with both hands. However, the two lenses of the binocular magnifying glass are spaced apart by a fixed distance which is not adjustable, so that the glass has the following problem.

Ophthalmic optically, it is desired that the optical center of each lens be positioned on the visual axis of the corresponding one of the eyes of the user, but the pupillary distance differs from person to person within the range of about 15 mm. If the optical center of the lens is not positioned on the visual axis, a double image is formed by a prismatic action of the lens, with the result that an objectionable fusion image gives a pain to the wearer. Accordingly, the deviation is generally restricted so that the prismatic action of the lens will not exceed 0.5 D (dioptor). In case of binocular magnifying glasses, the allowable value of the deviation is about 1 mm even if the magnification is low, and the allowable value decreases with increasing magnification. The conventional binocular magnifying glass therefore fails to meet the above requirements for many and unspecified persons. Consequently, the deviation of the optical center of the lens from the visual axis, even if slight, causes fatigue to the eye, making the wearer unable to use the binocular magnifying lens for a prolonged period of time and possibly impairing his health.

The lenses of the binocular magnifying glass are housed in a case, which is held to the eyes for use, so that the glass affords only a front view through the lenses. Because the field of view is thus extremely limited, the wearer is unable to recognize his surroundings and is likely encounter a hazard during working.

The magnifying glasses of various types described comprise a convex lens for viewing an enlarged virtual image of an object. To obtain a sharp image, the object must be located at a specified position within the focal distance of the convex lens. For observation, therefore, the glass must be brought close to the object. This entails the problem that a sufficient work space is not available between the object and the lens. Furthermore, the shortened distance between the eye and the object causes fatigue to the eye.

These problems can be solved by using a convex lens having an increased focal distance, but a greatly decreased magnification will then result.

Accordingly, it has been strongly desired to provide a magnifying glass which is free of the above drawbacks for use in the field of precision work.

SUMMARY OF THE INVENTION

A first object of the invention is to provide an optical device which comprises a pair of objective convex lenses and a pair of eyepiece concave lenses arranged on the principle of ophthalmic optics for use in precision work and in which the distance between the lenses in each pair is adjustable according to the pupillary distance of the wearer, the optical center of each lens being positionable on the corresponding visual axis.

Another object of the invention is to provide an optical device which, when worn, enables the wearer to recognize his surroundings so as to perform work with safety.

The optical device of the present invention comprises a wearing member to be attached to the body of the user, first lens holding means provided on the wearing member, and a pair of eyepiece concave lenses attached to the first lens holding means and spaced apart by an adjustable distance. Second lens holding means is connected to the wearing member or to the first lens holding means and has attached thereto a pair of objective convex lenses which are spaced apart from each other by an adjustable distance.

With the optical device of the present invention, the distance between the concave lenses and the distance between the convex lenses are adjustable each independently of the other, so that the optical center of each lens can be accurately positioned on the corresponding visual axis of the user. Thus, an object can be observed with the center of each lens on the visual axis. This obviates the burden on the eye due to an objectionable fusion image, greatly alleviating the fatigue of the eyes even if the device is used for a prolonged period of time.

Furthermore, the distance between each convex lens and the corresponding concave lens is adjustable, thereby enabling the user to obtain the sharpest image. Since the distance between the concave lenses and the distance between the convex lenses are adjustable each independently of the other, the optical center of each lens is positionable on the corresponding visual axis without any trouble.

The optical device of the present invention is adjustable in the lens-to-lens distances according to the wearing condition and is therefore usable commonly by many and unspecified persons.

Further with the optical device of the present invention, an image of the object enlarged by the convex lenses is observed as slightly diminished by the concave lenses. This arrangement enables the user to observe an enlarged sharp image of the object with the objective convex lenses positioned at a larger distance from the object than when the image enlarged by the objective convex lenses is observed directly. When the distance between the objective convex lens and the object is made larger than the distance giving a sharp image in the case of the conventional magnifying glasses described, the image obtained is more enlarged but is less sharp. According to the invention, however, each concave lens is positioned close to the eye of the user and at a distance from the convex lens, so that when the objective convex lens is positioned at an increased distance from the object, the image obtained on a further enlarged scale but with reduced sharpness is corrected through the concave lens. Consequently, the user can view an image which is slightly diminished but made sharp again by the action of the concave lens. Thus, the present device affords a sufficient work space between the object and each objective convex lens without resulting in a greatly reduced magnification.

Moreover, each lens is left open at every side thereof, enabling the wearer of the device to recognize his surroundings.

DETAILED DESCRIPTION OF EMBODIMENTS

Figure 6:
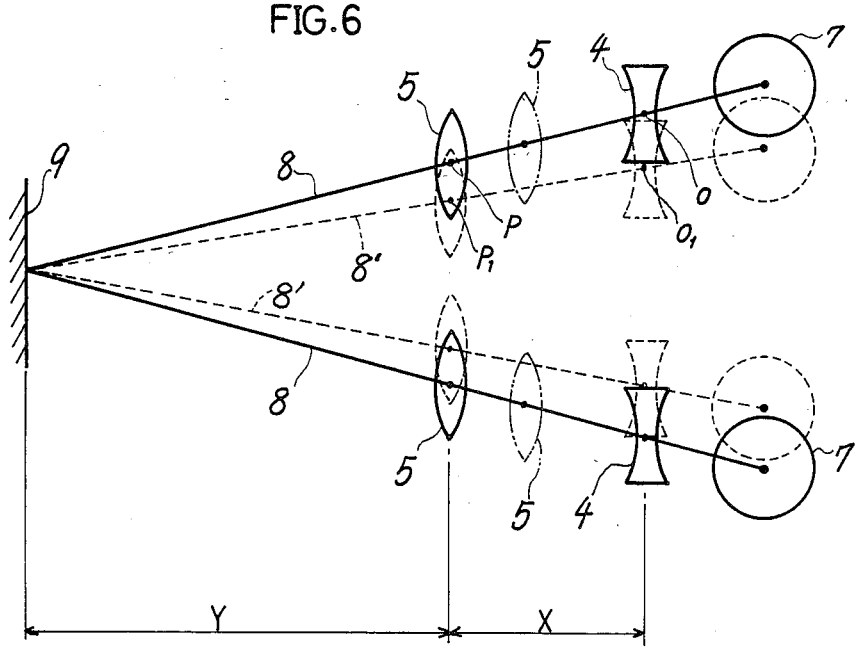
FIG. 6 is a diagram for illustrating the principle of the optical devices of the invention.

With reference to FIG. 6, the optical device of the invention comprises a pair of eyepiece concave lenses 4, 4 and a pair of objective convex lenses 5, 5 which are arranged on visual axes 8, 8 extending from the eyes 7, 7 of the wearer to the object 9 to be observed. The eyepiece concave lenses 4, 4 are held by first lens holding means attached to a wearing member as will be described later. The objective convex lenses 5, 5 are held by second lens holding means as will be described later.

With the present optical device, a slightly obscure enlarged image obtained through the objective convex lenses is observed as slightly diminished and made sharp by the eyepiece concave lenses.

When the wearer has a large distance between the eyes 7, 7 as indicated in solid lines in FIG. 6, the convex lenses 5, 5, as well as the concave lenses 4, 4, are spaced apart by a large distance to position the optical centers O, P of the lenses 4, 5 on the respective visual axes 8 to align the direction OP of the optical centers of the lenses for each eye with the corresponding visual axis for the observation of the object.

Further when the wearer has a small distance between the eyes 7, 7 as indicated in broken lines in FIG. 6, the convex lenses 5, 5, as well as the concave lenses 4, 4, are spaced apart by a small distance to position the optical centers O1, P1 of the lenses on the respective visual axes 8', whereby the direction O1P1 of the optical centers of the lenses for each eye can be made to match the direction of the corresponding visual axis.

Opera glasses are known as optical devices which comprise a pair of objective convex lenses and a pair of eyepiece concave lenses in combination therewith. However, the opera glasses are used for observing objects which are positioned outside the focal distance of the convex lenses at a large distance therefrom and differ from the present device which is intended for use in observing an object in the vicinity of the focal distance, with respect to the function of the lenses and also in respect of construction as described below. For example, if the distance between the eyepiece lenses 4 only is adjusted as indicated in broken lines in FIG. 6, with the distance between the objective lenses 5 unchanged, the direction of optical centers of the lenses 4, 5 for each eye is O1P and deviates from the visual line 8. If the eyepiece and objective lenses 4, 5 are moved at the same time as a set in conformity with the distance between the eyes as is the case with the opera glasses, the direction OP is merely translated, failing to match the direction O1P1 and deviating from the visual axis 8'. Since the opera glasses are used for observing far objects, the directions OP and O1P1 are approximately the same, hence no problem, whereas when an article is observed at a very small distance as in precision work, the deviation fatigues the eyes of the user to impair his health as already stated. However, the optical device of the invention is so adjustable at all times that the lines through the centers of the lenses are in match with the respective visual axes of the eyes of the user, and is therefore well suited to use in precision work.

Furthermore, the convex lenses 5, 5 are position-adjustable toward or away from the eyes as indicated in dot-and-dash lines in FIG. 6. At this time, the distance between the convex lenses is also adjustable at the same time, with the result that the optical center of each convex lens can be positioned on the corresponding visual axis 8 without any trouble.

According to the present invention, the magnification of the device can be determined by the focal distance of the convex lenses, and the distance between the objective convex lenses and the object by the focal distance of the convex lenses. In inspecting the wiring of electronic devices, it is throught desirable that the magnification be about 2× to about 3×. With reference to FIG. 6 again, a device was fabricated according to the invention using objective convex lenses of 6D (16.7 cm in focal distance) and eyepice concave lenses of 2D (50 cm in focal distance). A sharp image of an object 9 was observed by persons with normal visual acuity when the distance X between the opposed objective and eyepiece lenses 5, 4 was about 7 cm, with the objective lenses 5 at a distance Y of about 15 cm from the object 9. When the object was observed only through the objective convex lenses without using the eyepiece lenses, a sharp image was observable when the objective lenses were at a distance of about 9 cm from the object. In this case, therefore, the distance between the object and the objective convex lens can be about 6 cm greater than is the case with the conventional magnifying glass.

Some specific embodiments of the invention will be described below with reference to FIGS. 1 to 5.

First Embodiment

Figure 1:
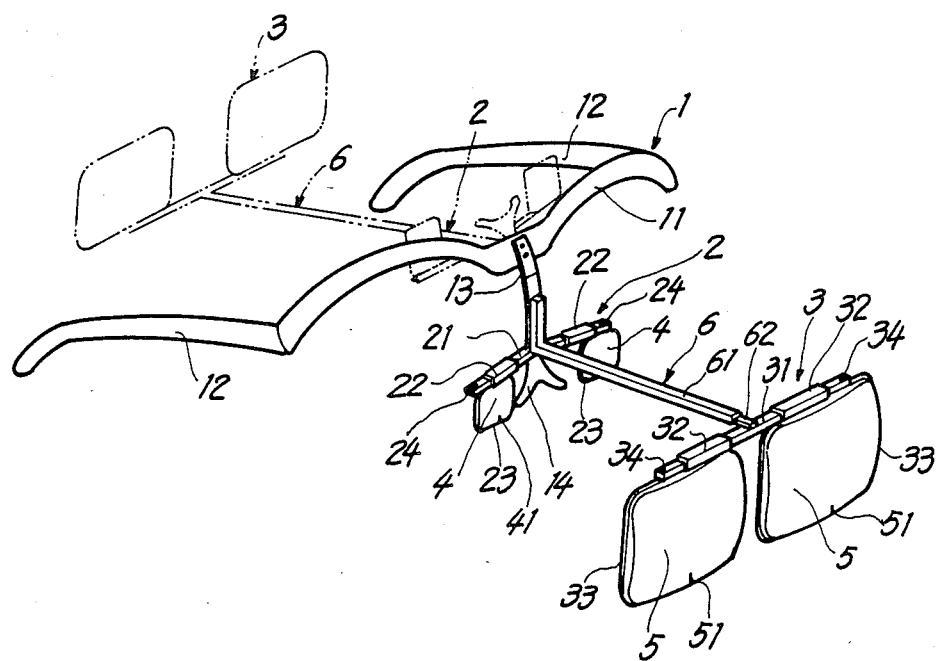
FIG. 1 is a perspective view of an optical device embodying the invention and having a spectacle frame as a wearing member.

The optical device of FIG. 1 includes a spectacle frame 1 as a wearing member. The spectacle frame 1 comprises a main frame member 11 and temples 12, 12 hingedly connected to the respective ends of the main frame member 11. A connector 13 extends downward from the midportion of the main frame member 11 and is provided at its lower end with a projecting nose pad 14.

The main frame member 11 is curved round as it extends from the midportion toward its opposite ends, and is so shaped as to be worn from above usual spectacles.

The connector 13 has at its lower end a first auxiliary arm 2 serving as means for holding concave lenses 4. The auxiliary frame 2 comprises a horizontal bar 21 secured at its midportion to the lower end of the connector 13, a pair of tubular sliders 22, 22 slidably fitted to the respective end portions of the bar 21, and rims 23 projecting downward from the respective sliders 22. The concave lens 4 is fitted in the rim 23.

A spring piece (not shown) is interposed between the horizontal bar 21 and each slider 22 for lightly engaging the slider 22 to prevent the slider 22 from backlashing, whereby the slider 22 is retained at a desired position along the bar 21. The horizontal bar 21 has at each end thereof a stopper 24 for preventing the slider 22 from slipping off.

A support bar 6 extending forward from the connector 13 is provided at its forward end with a second auxiliary frame 3 serving as means for holding convex lenses 5.

The support bar 6 comprises a tubular bar member 61 and an auxiliary bar member 62 slidably fitted in the member 61 and is therefore telescopic. A spring (not shown) is interposed between the bar member 61 and the auxiliary bar member 62 for lightly engaging the bar member 62 to prevent the member 62 from backlashing, whereby the auxiliary bar member 62 is retainable at a desired withdrawn position.

The second auxiliary frame 3 has the same construction as the first auxiliary frame 2 although larger than the frame 2. The second frame 3 comprises a horizontal bar 31 secured at its midportion to the forward end of the auxiliary bar member 62, a pair of tubular sliders 32, 32 slidably fitted to the respective end portions of the bar 21, and rims 33 projecting downward from the respective sliders 32. Each slider 32 is prevented from slipping off by a stopper 34. The convex lens 5 is fitted in each rim 33.

Preferably, the lenses 4, 5 are provided at the upper or lower portion thereof with marks 41, 51, respectively, for indicating the optical center of the lens with respect to the slidwise direction.

The connector 13 is foldable in two approximately at its midportion, such that the lower portion thereof is foldable inwardly of the main frame 11 as indicated in dot-and-dash lines in FIG. 1.

The optical device described provides a sufficient space for precision work between the work site and the convex lenses since an enlarged sharp image of the object can be seen even if the convex lenses 5 are at a sufficient distance from the object. Further because the device can be worn in engagement with the ears like the usual spectacles, both hands are usable for the work.

The distance between the concave lenses 4, 4 and the distance between the convex lenses 5, 5 are adjustable independently of each other, so that the optical centers of the lenses can be positioned accurately on the respective visual axes of the eyes of the user. Moreover, the distance between the convex lenses 5 and the concave lenses 4 is adjustable so that the user can view the sharpest image. In this case, the distance between the concave lenses and the distance between the convex lenses are each adjustable, whereby the optical center of each lens can be positioned on the visual axis concerned.

Ophthalmic optically, therefore, the present optical device is ideal in that it is usable in an optimum condition for every one of many and unspecified persons.

Further when the lenses 4, 5 are provided with the respective marks 41, 51 each positioned in corresponding relation to the optical center of the lens, the optical center of each lens can be matched with the corresponding visual axis with greater ease.

Further because the first and second auxiliary frames 2 and 3 are left open at their opposite sides, the surroundings of the user are in sight, enabling the user to perform the contemplated work with safety.

Second Embodiment

Figure 2:
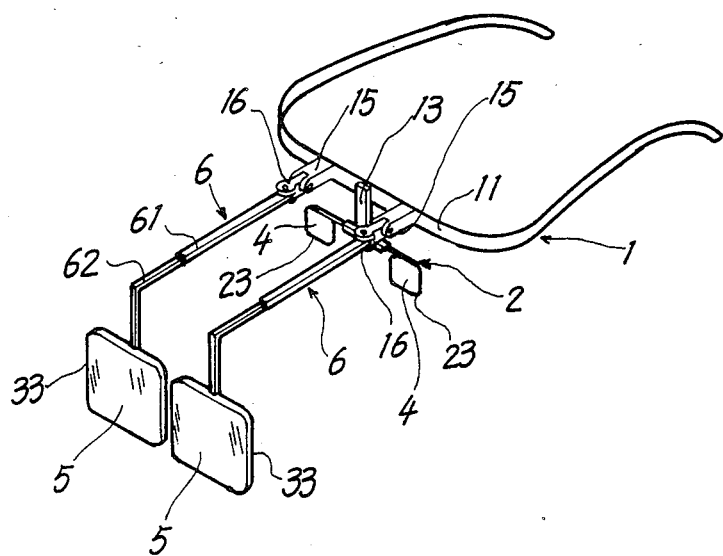
FIG. 2 is a perspective view of another optical device embodying the invention and having a spectacle frame as a wearing member.

FIG. 2 shows another optical device of the invention including a spectacle frame 1. A first auxiliary frame 2 similar to the one shown in FIG. 1 and adjustable in lens-to-lens distance is connected to the midportion of a main frame 11 by a connector 13.

The main frame 11 has a pair of support pieces 15, 15 projecting therefrom and positioned at opposite sides of the connector 13. Connected to each support piece 15 is an intermediate piece 16 which is pivotally movable within a vertical plane and retainable at a desired angle. A support bar 6 movable within a horizontal plane and retainable at a desired angle is connected to the forward end of the intermediate piece 16.

The support bar 6, like the foregoing one, comprises a tubular bar member 61 and an auxiliary bar member 62 slidably fitted in the member 61. The forward end of the auxiliary bar member 61 is bent downward, and a rim 33 for a convex lens 5 is secured to the extremity of the bent end.

With the optical device described above, like the embodiment of FIG. 1, the distance between a pair of concave lens rims 23, 23 is adjustable, while the two support bars 6, 6 are movable toward or away from each other to adjust the distance between the convex lenses 5, 5. Furthermore, each support bar 6 is extendable or contractable to adjust the distance between the convex lens 6 and the concave lens 4 opposed thereto. Incidentally, when the support bars are moved away from each other, the orientation of each convex lens changes relative to the concave lens, so that the change, if great, requires angular adjustment of the convex lens. This can be realized, for example, by making the convex lens rim 33 rotatable relative to the end of the auxiliary bar member 62 although not shown.

Third Embodiment

Figure 3:
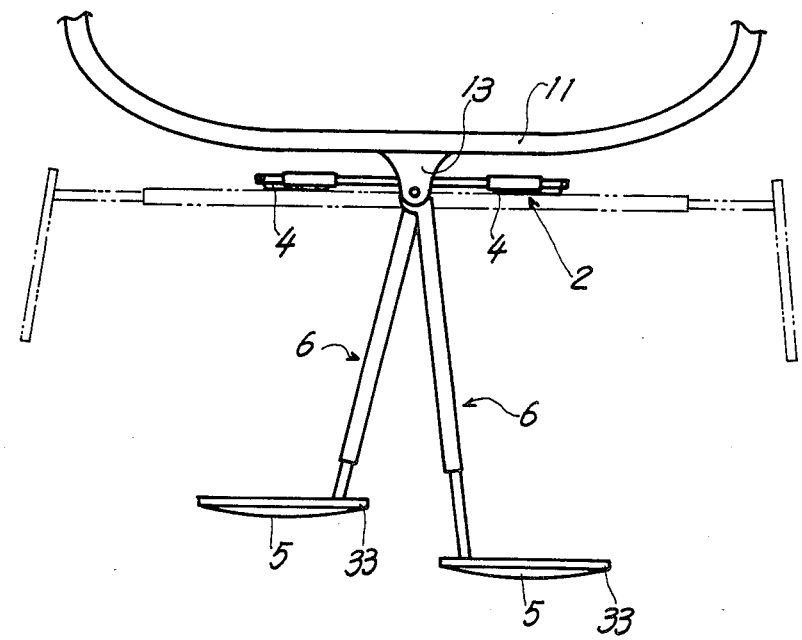
FIG. 3 is a plan view of another optical device embodying the invention and having a spectacle frame as a wearing member.

FIG. 3 shows another optical device which comprises a stretchable first auxiliary frame 2 carrying concave lenses 4 and attached to the midportion of a main frame 11 by a connector 13. Projecting from the upper portion of the connector 13 are a pair of support bars 6, 6 which are movable toward or away from each other within a horizontal plane and retainable at a desired angle of opening. Each of the support bars 6 is telescopic as in the foregoing embodiments and has a convex lens rim 33 projecting from its forward end 6.

As indicated in dot-and-dash lines, the support bars 6 and 6 are foldable to a position alongside the main frame 11.

Fourth Embodiment

Figure 4:
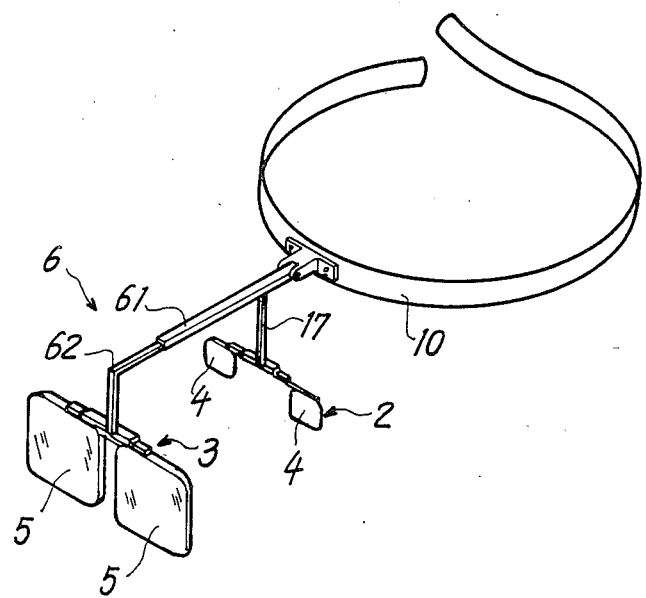
FIG. 4 is a perspective view of another optical device embodying the invention and having a fastening band as a wearing member.

FIG. 4 shows another optical device having a band 10 serving as the wearing member to be fixed to the head of the user.

Projecting from the band 10 is a tubular bar member 61 which is pivotally movable within a vertical plane and retainable at a desired angle. An auxiliary bar member 62 slidably fitted in the bar member 61 has a downwardly bent forward end. A second auxiliary frame 3 adjustable in lens-to-lens distance like the one shown in FIG. 1 is attached to the extremity of the bent end.

The bar member 61 has a support rod 17 projecting from its base end portion. Attached to the free end of the support rod 17 is a first auxiliary frame 2 which is adjustable in lens-to-lens distance like the one shown in FIG. 1. As illustrated, the support rod 17 is pivotally movable within a vertical plane relative to the base end portion of the bar member 61 and is retainable at a desired angle. This assures adjustment for the user with greater ease.

Fifth Embodiment

Figure 5:
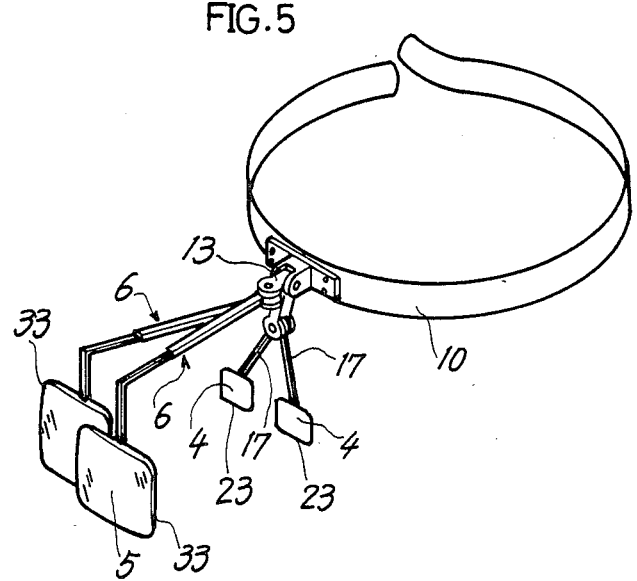
FIG. 5 is a perspective view of another optical device embodying the invention and having a fastening band as a wearing member.

FIG. 5 shows another optical device wherein a band 10 has attached to its front side a connector 13 which is pivotally movable within a vertical plane and retainable at a desired angle. The connector 13 has attached thereto a pair of telescopic support bars 6, 6 which are pivotally movable within a horizontal plane and retainable at a desired angle of opening. Each support rod 6 has a convex lens rim 33 projecting from its free end.

The connector 13 further has an arm extending downward therefrom. The arm is provided at the extended end with a pair of support rods 17, 17 which are movable toward or away from each other and retainable at a desired angle of opening. Each support rod 17 carries a concave lens rim 23 at its free end.

The construction of various portions of the present device is not limited to those of the foregoing embodiments but can be modified variously within the scope of the invention as defined in the appended claims

What is claimed is:

1. An optical device including a pair of eyepiece concave lenses and a pair of objective convex lenses for use in precision work, the device being characterized in that the device comprises a wearing member to be attached to the body of the user; first lens holding means provided on the wearing member and having attached thereto the pair of eyepiece concave lenses spaced apart by an adjustable distance; and second lens holding means connected to the wearing member or to the first lens holding means and having attached thereto the pair of objective convex lenses spaced apart by an adjustable distance and spaced from the concave lenses by an adjustable distance; each of the eyepiece concave lenses and the objective convex lenses having an optical center positionable on the visual axis extending from the corresponding eye of the user to an object.

2. An optical device as defined in claim 1 wherein each eyepiece concave lens and each objective convex lens bear marks, respectively, for indicating the optical center of the lens.

3. An optical device as defined in claim 1 wherein the wearing member comprises a spectacle frame, and the spectacle frame comprises a main frame member, a pair of temples hingedly connected to the respective ends of the main frame member, a connector extending downward from the midportion of the main frame member and a nose pad projecting downward from the lower end of the connector.

4. An optical device as defined in claim 3 wherein the first lens holding means comprises a first auxiliary frame, and the first auxiliary frame comprises a horizontal bar secured at its midportion to the lower end of the connector, a pair of tubular sliders slidably fitted to the respective ends of the horizontal bar and each retainable at a desired position in light engagement with the bar, and a pair of lens rims projecting downward from the respective sliders.

5. An optical device as defined in claim 3 wherein the second lens holding means comprises connecting means extending from the connector and adjustable in length, and a second auxiliary frame attached to the forward end of the connecting means, the second auxiliary frame comprising a horizontal bar secured at its midportion to the forward end of the connecting means, a pair of tubular sliders slidably fitted to the respective ends of the horizontal bar and each retainable at a desired position in light engagement with the bar, and a pair of lens rims projecting downward from the respective sliders.

6. An optical device as defined in claim 5 wherein the connecting means comprises a support bar, and the support bar comprises a bar member extending from the connector and an auxiliary bar member slidably fitted to the bar member and retainable at a desired position in light engagement with the bar member, the auxiliary bar member having the second auxiliary frame attached to its forward end.

7. An optical device as defined in claim 3 wherein the second lens holding means comprises a pair of support pieces spaced apart from each other and projecting from the midportion of the main frame member, a pair of stretchable support bars connected to the forward ends of the support pieces respectively and movable toward or away from each other with an adjustable angle formed therebetween, and a pair of rims secured to the free ends of the support bars respectively for the objective convex lenses.

8. An optical device as defined in claim 3 wherein the second lens holding means comprises a pair of stretchable support bars connected to the connector and movable toward or away from each other with an adjustable angle formed therebetween and a pair of rims secured to the free ends of the support bars respectively for the objective convex lenses.

9. An optical device as defined in claim 1 wherein the wearing member comprises a band to be fitted around the head of the user.

10. An optical device as defined in claim 9 wherein the first lens holding means comprises a bar member projecting from the band, a support rod extending downward from the base end portion of the bar member and a first auxiliary frame attached to the free end of the support rod and holding the pair of eyepiece concave lenses thereon as spaced apart from each other by an adjustable distance, and the second lens holding means comprises an auxiliary bar member slidably fitted to the bar member and retainable at a desired position in light engagement with the bar member, the auxiliary bar member having a downwardly bent forward end portion, and a second auxiliary frame attached to the extremity of the bent end portion and holding the pair of objective convex lenses thereon as spaced apart from each other by an adjustable distance.

11. An optical device as defined in claim 9 wherein the first lens holding means comprises a connector projecting from the front side of the band, a pair of support rods having an adjustable angle of opening therebetween and extending from the lower portion of the connector, and a pair of rims secured to the forward ends of the support rods respectively for the eyepiece concave lenses, and the second lens holding means comprises a pair of stretchable support bars having an adjustable angle of opening therebetween and extending from the front portion of the connector, each of the support bars having a downwardly bent forward end, and a pair of rims secured to the extremities of the bent ends of the pair of support bars respectively for the objective convex lenses.

12. An optical device as defined in claim 1 wherein the eyepiece lenses are left open at their side portion for the wearer of the device to recognize his surroundings.

13. An optical device for use in precision work comprising a wearing member to be attached to the body of the user, first lens holding means connected to the wearing member for holding thereon a pair of eyepiece concave lenses as spaced apart by an adjustable distance, and second lens holding means connected to the wearing member or to the first lens holding means for holding thereon a pair of objective convex lenses as spaced apart by an adjustable distance, the pair of eyepiece concave lenses and the pair of objective convex lenses being attachable to the first and second lens holding means respectively with the optical center of each lens positioned on the visual axis extending from the corresponding one of the eyes of the user to an object.

* * * * *